United States Patent [19]

Suzuki et al.

[11] Patent Number: 5,064,608

[45] Date of Patent: Nov. 12, 1991

[54] CAMSHAFT AND METHOD FOR PRODUCING THE SAME

[75] Inventors: Yasuo Suzuki; Shunsuke Takeguchi, both of Tochigi, Japan

[73] Assignee: Nippon Piston Ring Co., Ltd., Tokyo, Japan

[21] Appl. No.: 651,730

[22] Filed: Feb. 5, 1991

Related U.S. Application Data

[62] Division of Ser. No. 466,836, Jan. 18, 1990, Pat. No. 5,013,611.

[51] Int. Cl.$^5$ .............................................. B22F 7/00
[52] U.S. Cl. .................................... 419/8; 419/14; 419/15; 419/17; 419/18; 419/28; 419/29; 419/30; 419/54; 419/55; 75/239; 75/240; 75/241
[58] Field of Search ............ 419/15, 14, 17, 28, 419/29, 30, 54, 55, 18, 8; 75/239, 240, 241

[56] References Cited

U.S. PATENT DOCUMENTS

| | | | |
|---|---|---|---|
| 4,388,114 | 6/1983 | Suganuma et al. | 419/29 X |
| 4,518,563 | 5/1985 | Suganuma et al. | 75/243 |
| 4,861,372 | 8/1989 | Shimomura | 419/29 X |
| 4,904,302 | 3/1990 | Shimomura | 419/17 X |
| 4,927,707 | 5/1990 | Matsubara | 419/14 |

FOREIGN PATENT DOCUMENTS

| | | |
|---|---|---|
| 58-3901 | 1/1983 | Japan . |
| 63-162852 | 7/1988 | Japan . |
| 2105752 | 3/1983 | United Kingdom . |

OTHER PUBLICATIONS

"Heat Treatment Guidebook", May 15, 1983, pp. 150, 160.
"Heat Treatment Guidebook", Apr. 1, 1984, pp. 148–151.
"Heat Treatment to Steel", Oct. 1, 1969, p. 691.

*Primary Examiner*—Deborah L. Kyle
*Assistant Examiner*—Leon Nigohosian, Jr.
*Attorney, Agent, or Firm*—Sughrue, Mion, Zinn, Macpeak & Seas

[57] ABSTRACT

A method for producing a camshaft having a tubular steel shaft and a sintered cam piece joined to the shaft. The sintered cam piece has iron tetroxide film at its surface. The camshaft is produced by assembling a powder compact to the steel shaft to provide a camshaft assembly, sintering the assembly to provide an integral assembly, correcting bending to the assembly, annealing the assembly, grinding the cam piece and effecting vaporization treatment to the assembly at a temperature lower than the annealing temperature.

3 Claims, No Drawings

CAMSHAFT AND METHOD FOR PRODUCING THE SAME

This is a divisional of application Ser. No. 07/466,836 filed Jan. 18, 1990, now U.S. Pat. No. 5,013,611.

BACKGROUND OF THE INVENTION

The present invention relates to a sintered camshaft for use in an internal combustion engine and a method for producing the camshaft.

A sintered camshaft is known in which a sintered cam piece is joined to a steel pipe in order to provide a light weight structure with having high wear resistance and capable of sustaining high planar pressure and high load.

In this case, in order to improve initial break-in property and wear resistivity of the cam portion, a phosphate film treatment is effected at relatively low temperature, or nitriding treatment or vaporization treatment is effected at relatively high temperature.

In the above described sintered camshaft, if a large amount of alloy components such as Cr is contained in order to improve the wear resistivity, formation of the phosphate film may be interrupted by the alloy component when performing the phosphate film treatment, and therefore, the desired effect is not attained.

On the other hand, if nitriding treatment or vaporization treatment is effected in the cam shaft production process, two separate bending correction steps must be required. That is, in the sintered camshaft, after the cam piece formed of ferrous sintering compositions is assembled to a steel pipe, the assembly is subjected to sintering and diffusion bonding which is simultaneously carried out between the pipe and the cam piece within a sintering furnace. In this case, since the camshaft assembly is positioned within the high temperature furnace, deformation or bending may occur in the pipe. Therefore, after sintering in the sintering furnace, bending correction must be carried out to provide a linear orientation of the shaft. However, after the nitriding treatment or vaporization treatment at high temperature subsequent to the sintering step and grinding step to the cam piece, the bending is again provided since an internal stress remains in the pipe due to the first bending correction step. Therefore, additional bending correction is required after the grinding step. The second bending correction after the termination of the camshaft production requires high accuracy. And if it is impossible to effect the second bending correction, the finally obtained camshaft provided through the various production steps is deemed to be unacceptable for a commercial use, so that productivity of the cam shaft becomes remarkably lowered.

In order to remove internal stress due to the first bending correction step, an annealing and subsequent nitriding treatment has been proposed as disclosed in Japanese Patent Application Kokai No. 63-162852. This annealing is carried out for the purpose of removing the internal stress without application of any physical force such as the first bending correction. However, in the case of the sintered camshaft, a surface layer of the cam piece may be peeled off at high load operation if the camshaft is subjected to the nitriding treatment.

Therefore, a camshaft is provided in which a film of iron tetroxide ($Fe_3O_4$) is formed by the vaporization treatment. On the other hand, Japanese Patent Application Kokai No. 58-3901, which corresponds to U.S. Pat. No. 4,518,563, discloses a method for forming a film of iron tetroxide on a cam shaft which employs ferrous alloy powders containing relatively large amounts of Cr and Cu. In this method, thin films are sufficiently formed under a reduced pressure condition on a surface of the sintered body and around sintering pores. However, the cam may be easily worn out if an excessive amount of iron tetroxide film is formed.

SUMMARY OF THE INVENTION

In view of the above, an object of the present invention is to provide a sintered camshaft having excellent initial break-in property and wear resistivity.

Another object of the invention is to provide a method of producing the sintered camshaft having the excellent initial break-in property and wear resistance at high productivity.

In order to attain the above described objects, according to one aspect of the invention, a camshaft is provided comprising a cam piece formed of a sintered alloy and, a tubular steel shaft to which the cam piece is joined, the alloy comprising 1.5 to 3.0% by weight of C, 0.5 to 1.2% by weight of Si, not more than 1.0% by weight of Mn, not more than 5.0% by weight of at least one of the materials selected from the group consisting of Ni and Mo, not more than 20.0% by weight of Cr, not more than 10% by weight of at least one of the materials selected from the group consisting of W, Nb and V, 0.2 to 1.0% by weight of P, not more than 0.1% by weight of S, but without copper, and the balance Fe, and a surface layer portion of the cam piece being formed with iron tetroxide film. The iron tetroxide film preferably occupies a surface area of the cam piece by an area coverage of 60 to 80%.

Further according to another aspect of the invention is provided a method for producing a camshaft comprising the steps of: preparing metal powders, compressing the metal powders to obtain a compressed powder compact for a cam piece, assembling the powder compact to a steel pipe and sintering the and joining the powder compact to the steel pipe for producing a camshaft assembly, effecting bending correction to the camshaft assembly; annealing the camshaft assembly for removing an internal stress which may be generated due to the bending correction, grinding the cam piece; and effecting vaporization treatment to the camshaft assembly at a temperature lower than a temperature of the annealing.

DETAILED DESCRIPTION OF THE PREFERRED EMBODIMENT

The reasons for providing the percentile limitations with respect to each of the elements in the alloy compositions of the cam piece will be described hereinafter.

In the present invention, C is contained in the sintered alloy by 1.5 to 3.0% by weight. Within this range, a part of C is solid-solved in a matrix to strengthen the same, and remaining C forms carbides. Of the carbon content less than 1.5%, formation of the carbides may not be obtainable so that wear resistance and self-lubricating function may be lowered. However, if the carbon content exceeds 3.0%, excessive amount of carbides are formed, Further, excessive liquid-phase may be provided by the reaction with P, so that a desired cam piece shape cannot be maintained as an assembling piece.

Also, 0.5 to 1.2% by weight of Si is contained in the sintered alloy in order to strengthen the matrix. If the amount is less than 0.5%, this effect may not be attainable. On the other hand, if the Si amount exceeds 1.2%, moldability for pressure molding the powders may be lowered, and large deformation may occur during sintering. Further, formation of the carbide may be interrupted, and graphite may be precipitated, to thereby lower wear resistivity.

Not more than 1.0% by weight of Mn is contained in the sintered alloy of this invention. Mn is inevitably contained in a raw iron powders in a form of MnS. Mn is solid-solved in the matrix to promote formation of a pearlitic matrix. However, if the Mn amount exceeds 0.3%, promotion of the sintering is restrained, and as a result, coarse pores are provided. Further, moldability for the pressure molding is lowered. However, if the promotion of the pearlitic matrix or the improvement on hardening is intended, the amount of the Mn must be not more than 1.0%, otherwise the disadvantages described above (in terms of formation of coarse pores, and lowered moldability) are remarkably noticeable.

Not more than 5.0% by weight of at least one of Ni and Mo is contained in the sintered alloy. Ni and Mo primarily serve to strengthen the base matrix, and partly serve to improve wear resistivity because of the formation of carbides. These effects cannot be provided in the presence of more than 5.0% of at least one of Ni and Mo. If the amount exceeds 5.0%, hardness becomes excessively high, to thereby lower machinability.

Not more than 20.0% by weight of Cr is contained in the sintered alloy, and not more than 10% by weight of at least one of W, Nb and V are contained in the alloy. Cr, W, Nb and V are the components for forming carbides. According to the present invention, relatively large amounts of these components are contained so as to improve wear resistance of the cam piece. Among these, Cr is the most effective component and is used as an essential component. W, Nb and V are selectively included.

On the other hand, according to the present invention, a film of iron tetroxide is formed on a surface layer of the cam piece so as to improve initial break-in property. Through experiments, it has been found that wear amount of the camshaft as well as the opponent member can be reduced, if the film occupies a surface area of the cam piece by an area coverage of 60 to 80%. The film of iron tetroxide is formed on the base matrix, and the film cannot be formed in the carbide since the latter does not contain iron. Accordingly, the amount of the iron tetroxide film can be controlled within a proper range by controlling precipitation amount of the carbides through the control of adding amounts of the carbide formation components and adding amount of C.

To attain this, the amount of Cr should not exceed 20.0% and, not more than 10% of at least one of a material selected from the group consisting of W, Nb, and V should be contained. The lower limit of the carbide formation components such as Cr, W, Nb and V should be 3.0%. If the total amount of these components is less than 3.0%, the area rate of the iron tetroxide exceeds 80% to thereby increase wearing amount of the cam piece. On the other hand, the upper limit of the carbide formation components is 23%. If the amount exceeds this value, excessive amount of the carbides are provided to thereby lower the area rate to less than 60%. Consequently, the opponent member may be excessively worn out.

In the sintered alloy of this invention, 0.2 to 1.0% by weight of P is contained. P will generate hypoeutectic steadite with the system of Fe-C-P, which allows the cam piece to enhance the wear resistance. If the P amount is less than 0.2%, no relevant effect is obtainable. On the other hand, if P amount exceeds 1.0%, the precipitation amount of steadite is excessively increased to thereby lower the machinability, and the brittleness may be promoted.

Not more than 0.1% by weight of S is contained in the sintered alloy. S is inevitably contained in the raw iron powders in the form of sole S or MnS. S amount should be not more than 0.1% so as to prevent the final product from being brittle.

Further according to a method of the present invention, metal powders having a proper mixing ratio are prepared. In this preparation step, amounts of C and carbide forming components such as Cr, W, Nb and V are selected within a proper range in order to control the precipitation amount of the carbide which is generated after a sintering step to thus control the formation amount of the iron tetroxide film as described above. Then, these powders are compressed to obtain a powder compact to thus obtain a cam piece body. Thereafter, the powder compact is assembled to a steel pipe to obtain a camshaft assembly. Thereafter, the assembly is sintered in a sintering furnace so that the cam piece portion is joined to the shaft.

As a result of the sintering, the cam piece has an alloy composition comprising 1.5 to 3.0% by weight of C, 0.5 to 1.2% by weight of Si, not more than 1.0% by weight of Mn, not more than 5.0% by weight of at least one of the materials selected from the group consisting of Ni and Mo, not more than 20.0% by weight of Cr, not more than 10% by weight of at least one of the materials selected from the group consisting of W, Nb and V, 0.2 to 1.0% by weight of P, not more than 0.1% by weight of S, but without copper, and balance Fe.

Further, as a result of the sintering, the camshaft assembly may be deformed, particularly, the shaft portion may be bent. Therefore, the camshaft assembly is subjected to bending correction so as to correct orientation of the shaft portion. However, in this correction step, new internal stress may be generated within the shaft portion or the camshaft assembly since a new physical force is exerted on the assembly for the bending correction. Consequently, the camshaft assembly is then subjected to annealing for removing the internal stress. Then, the cam piece is subjected to grinding for finishing purposes, and then a vaporization treatment is performed on the camshaft assembly at a temperature lower than temperature of the annealing. The vaporization step does not cause any new bending since the temperature of the vaporization treatment is lower than the annealing temperature.

In the above described sintered camshaft or the method for producing the same, large amount of carbides such as Cr-carbide, W-carbide, Nb-carbide and V-carbide are formed in the cam piece, and therefore, excellent wear resistance is provided. Further, excellent initial break-in property is obtained since a film of tetroxide is formed by the vaporization treatment.

Further, wear amounts of the camshaft itself and opponent member can be further reduced by controlling the forming amount of the iron tetroxide film within a predetermined range by controlling the precipitation amount of the carbides.

Furthermore, after effecting bending correction on the shaft, which bending may be provided by new sintering, the internal stress is generated during the bending correction step. However, this internal stress is removed by the annealing. Moreover, even if the subsequent vaporization treatment is carried out at a high temperature, no secondary bending occurs so long as the treatment is conducted at a temperature lower than the temperature of annealing. Therefore, a sintered camshaft having high dimensional accuracy can be produced.

EXAMPLE

A cam piece body, a journal piece and a steel pipe were prepared. The cam piece body was prepared by a compressed powder body containing ferrous alloy powders, and the journal piece was made of a steel or was prepared by a compressed powder body containing ferrous alloy powders whose quality was lower than that of the compressed powder body of the cam piece. The cam piece body and the journal piece were assembled to the steel pipe, and sintering bonding was carried out at a temperature of 1,100° to 1,200° C. for about 1 to 2 hours. Then, the assembly was cooled. Because of such production steps, the steel pipe may be bent, and therefore, bending correction was performed on to the assembly. Further, annealing was carried out so as to remove an internal stress generated by the pressure application during the bending correction step. The assembly was annealed at a temperature ranging from 600° to 650° C. for about 1 to 2 hours in view of the fact that the austenitic transformation temperature of the ferrous sintered body is around 700° C., and a subsequent vaporization treatment was carried out at a temperature of around 580° C. The assembly was cooled within the furnace.

Then, the assembly was subjected to grinding, and thereafter, the vaporization treatment was carried out at a temperature lower than the temperature of annealing treatment for 1 to 3 hours. By the vaporization treatment, a layer of iron tetroxide was formed at a surface layer of the cam piece for improving the wear resistance. Particularly, initial break-in property will become improved.

In accordance with the above-described production steps, camshafts (sample Nos. 1 thru 10) according to the present invention were produced and comparative camshaft samples (sample Nos.11 thru 16) were also produced. In each of the samples, surface hardness and area rate of the iron tetroxide was measured, and thereafter, each of the samples was installed in an engine in order to perform wear resistance tests.

That is, each of the cam shafts was installed in a four-cylinder in-line internal combustion engine having a displacement of 1.8 liters in such a manner that the cam shaft is in sliding contact with a rocker arm. The engine was rotated at engine speed of 2000 r.p.m. for 200 hours. After the engine operation, the wearing amount of the cam and the rocker arm (referred to as "RA" in a Table) and generation of scuffing in the cam were investigated.

The rocker arm had a main body and a sliding portion formed of a high chromium system cast iron chip to which nitriding treatment was effected. The sliding chip was subjected to round-casting by the main body formed of an aluminum.

TABLE

| | Sample Nos. | compositions (wt %) | | | | | | | | | | |
|---|---|---|---|---|---|---|---|---|---|---|---|---|
| | | C | Si | Mn | Ni | Mo | Cr | W | Nb | V | P | S | Fe |
| present invention | 1 | 2.0 | 0.8 | 0.1 | 1.5 | 2.0 | 4.0 | — | — | — | 0.5 | 0.05 | balance |
| | 2 | 2.0 | 0.9 | 0.1 | 1.5 | 1.5 | 8.0 | — | — | — | 0.5 | 0.05 | balance |
| | 3 | 2.2 | 0.9 | 0.1 | 1.8 | 1.5 | 8.0 | — | 1.0 | — | 0.5 | 0.05 | balance |
| | 4 | 2.5 | 0.9 | 0.1 | 1.0 | 1.0 | 8.0 | — | — | 1.0 | 0.5 | 0.05 | balance |
| | 5 | 1.8 | 0.9 | 0.1 | 1.9 | 2.0 | 2.0 | 2.0 | — | — | 0.5 | 0.05 | balance |
| | 6 | 1.8 | 0.9 | 0.1 | 1.5 | 1.5 | 2.0 | — | 3.0 | — | 0.5 | 0.05 | balance |
| | 7 | 2.0 | 0.8 | 0.1 | 1.8 | 1.5 | 4.0 | 2.0 | — | — | 0.5 | 0.05 | balance |
| | 8 | 2.2 | 0.9 | 0.1 | 1.5 | 2.0 | 8.0 | — | — | — | 0.5 | 0.05 | balance |
| | 9 | 1.5 | 0.9 | 0.1 | 1.8 | 2.0 | 2.0 | — | — | — | 0.5 | 0.05 | balance |
| | 10 | 2.6 | 0.9 | 0.1 | 1.0 | 2.0 | 8.0 | 1.0 | 3.0 | 1.0 | 0.5 | 0.05 | balance |
| comparative examples | 11 | 2.6 | 0.9 | 0.1 | 1.5 | 1.0 | 11.2 | — | — | — | 0.5 | 0.05 | balance |
| | 12 | 2.6 | 0.9 | 0.1 | 1.3 | 1.5 | 8.0 | 8.0 | 2.0 | 1.0 | 0.5 | 0.05 | balance |
| | 13 | 2.5 | 0.9 | 0.1 | 1.5 | 1.7 | 4.0 | 10.0 | 4.0 | 1.0 | 0.5 | 0.05 | balance |
| | 14 | 2.0 | 0.8 | 0.1 | 1.5 | 1.5 | 8.0 | — | — | — | 0.5 | 0.05 | balance |
| | 15 | 2.0 | 0.8 | 0.1 | 1.5 | 1.5 | 8.0 | — | — | — | 0.5 | 0.05 | balance |
| | 16 | 2.0 | 0.8 | 0.1 | 1.5 | 1.5 | 8.0 | — | — | — | 0.5 | 0.05 | balance |

| | Sample Nos. | Condition of Vaporization Treatment | Surface Hardness | Area Rate Fe$_3$O$_4$ | Wear Amount ($\mu$m) | | Scuffing |
|---|---|---|---|---|---|---|---|
| | | | | | Cam | RA | |
| present invention | 1 | 580°C. × 2 hr | HRC 58 | 70 | 10 | 15 | no scuffing |
| | 2 | 580°C. × 2 hr | HRC 60 | 67 | 9 | 17 | no scuffing |
| | 3 | 580°C. × 2 hr | HRC 63 | 62 | 6 | 10 | no scuffing |
| | 4 | 580°C. × 2 hr | HRC 62 | 70 | 4 | 12 | no scuffing |
| | 5 | 580°C. × 2 hr | HRC 63 | 65 | 5 | 8 | no scuffing |
| | 6 | 580°C. × 2 hr | HRC 59 | 78 | 15 | 15 | no scuffing |
| | 7 | 580°C. × 2 hr | HRC 58 | 75 | 8 | 12 | no scuffing |
| | 8 | 580°C. × 2 hr | HRC 60 | 64 | 5 | 16 | no scuffing |
| | 9 | 580°C. × 2 hr | HRC 55 | 85 | 18 | 10 | no scuffing |
| | 10 | 580°C. × 2 hr | HRC 65 | 53 | 10 | 45 | no scuffing |
| comparative examples | 11 | 580°C. × 2 hr | HRC 61 | 55 | 8 | 57 | no scuffing |
| | 12 | 580°C. × 2 hr | HRC 64 | 48 | 185 | 230 | scuffing |
| | 13 | 580°C. × 2 hr | HRC 66 | 40 | 151 | 377 | scuffing |
| | 14 | 500°C. × 2 hr | HRC 58 | 60 | 78 | 152 | scuffing |
| | 15 | 550°C. × 2 hr | HRC 58 | 65 | 59 | 110 | scuffing |
| | 16 | 600°C. × 2 hr | HRC 59 | 68 | 19 | 138 | no scuffing |

As is apparent from the Table, if the amount of the carbide formation components such as Cr, W, Nb and V was outside the range according to the present invention, wear amount was increased with respect to the cam or the rocker arm or both cam and the rocker arm. Further, scuffing also occurred.

Further, if the surface occupying rate of the iron tetroxide was outside the range of 60 to 80%, the wearing amount of the cam and the rocker arm was increased as seen in sample numbers 9 and 10 even though test results attendant to these samples were superior to those of the comparative samples.

As described above, the present invention, provides a camshaft having excellent initial break-in property and high wear resistivity, and such high quality camshaft can be efficiently produced without conducting bending correction after grinding.

While the invention has been described and with reference to a specific embodiment thereof, it would be apparent to those skilled in the art that various changes and modifications can be made therein without departing from the spirit and scope of the invention.

What is claimed is:

1. A method for producing a camshaft comprising the following sequential steps of:
   providing metal powders;
   compressing the metal powders for forming a compressed powder compact for a cam piece;
   assembling the powder compact to a steel pipe:
   sintering and joining the powder compact to the steel pipe for producing a camshaft assembly;
   effecting bending correction to the camshaft assembly;
   annealing the camshaft assembly at a temperature for removing an internal stress which may be generated due to the bending correction step:
   grinding the cam piece; and
   effecting vaporization treatment to the camshaft assembly at a temperature lower than the annealing temperature.

2. The method of producing the camshaft as claimed in claim 1, wherein the provided metal powders are prepared by controlling the percentages of the metal powders to provide alloy compositions after the sintering step comprising 1.5 to 3.0% by weight of C, 0.5 to 1.2% by weight of Si, not more than 1.0 by weight of Mn, not more than 5.0% by weight of at least one of the materials selected from the group consisting of Ni and Mo, not more than 20.0% by weight of Cr, not more than 10% by weight of at least one of the materials selected from the group consisting of W, Nb and V, 0.2 to 1.0% by weight of P, not more than 0.1% by weight of S, and balance Fe.

3. The method of producing the camshaft as claimed in claim 2, wherein amounts of the Cr, W, Nb and V are controlled to control a surface area coverage of iron tetroxide film with respect to an entire surface of the cam piece.

* * * * *